United States Patent
Zhang et al.

(10) Patent No.: US 11,578,635 B2
(45) Date of Patent: Feb. 14, 2023

(54) POST-TREATMENT SYSTEM, METHOD FOR CONTROLLING POST-TREATMENT SYSTEM, AND VEHICLE

(71) Applicant: WEICHAI POWER CO., LTD., Shandong (CN)

(72) Inventors: Yu Zhang, Shandong (CN); Xiaohua Wang, Shangdong (CN); Yibao Wang, Shandong (CN); Wang Yao, Shandong (CN); Jinlong Fu, Shandong (CN)

(73) Assignee: Weichai Power Co., Ltd., Shandong (CN)

( * ) Notice: Subject to any disclaimer, the term of this patent is extended or adjusted under 35 U.S.C. 154(b) by 0 days.

(21) Appl. No.: 17/606,377

(22) PCT Filed: Apr. 26, 2019

(86) PCT No.: PCT/CN2019/084486
§ 371 (c)(1),
(2) Date: Oct. 25, 2021

(87) PCT Pub. No.: WO2020/215303
PCT Pub. Date: Oct. 29, 2020

(65) Prior Publication Data
US 2022/0213824 A1    Jul. 7, 2022

(51) Int. Cl.
*F01N 3/20* (2006.01)
*F01N 13/00* (2010.01)
(Continued)

(52) U.S. Cl.
CPC ........... *F01N 3/208* (2013.01); *F01N 13/009* (2014.06); *F01N 3/0878* (2013.01); *F01N 3/103* (2013.01);
(Continued)

(58) Field of Classification Search
CPC combination set(s) only.
See application file for complete search history.

(56) References Cited

U.S. PATENT DOCUMENTS 5,355,672 A * 10/1994 Adamczyk, Jr. ... B01D 53/9481
123/703
2008/0041052 A1   2/2008 Doring et al.
(Continued)

FOREIGN PATENT DOCUMENTS

CN      104718356 A      6/2015
CN      109322730 A      2/2019
(Continued)

OTHER PUBLICATIONS

PCT International Search Report and Written Opinion, PCT/CN2019/084486, dated Feb. 6, 2020, 11 pgs.
(Continued)

*Primary Examiner* — Binh Q Tran
(74) *Attorney, Agent, or Firm* — Fenwick & West LLP

(57) ABSTRACT

A post-treatment system includes two SCRs, a second SCR is connected to a booster in parallel, and a three-way valve is arranged before the second SCR and the booster, such that whether an exhaust gas flows through the second SCR or the booster is controlled by means of controlling the three-way valve. In the case of a low temperature, the three-way valve is controlled to close a branch of the booster, such that the exhaust gas flows through the second SCR and a first SCR that are connected in series, thereby reducing the energy loss caused by the exhaust gas flowing through the booster, and improving the $NO_x$ conversion efficiency in the case of a low temperature. In a case of a high temperature, the three-way valve is controlled to close a by-pass line, such that the exhaust gas flows through the booster and the first SCR.

7 Claims, 2 Drawing Sheets

(51) Int. Cl.
*F01N 3/10* (2006.01)
*F01N 3/08* (2006.01)
*F01N 13/08* (2010.01)

(52) U.S. Cl.
CPC .......... *F01N 3/2053* (2013.01); *F01N 13/087* (2013.01); *F01N 2410/02* (2013.01); *F01N 2410/10* (2013.01); *F01N 2410/12* (2013.01); *F01N 2550/06* (2013.01); *F01N 2560/026* (2013.01); *F01N 2560/06* (2013.01); *F01N 2610/02* (2013.01); *F01N 2900/1602* (2013.01)

(56) References Cited

U.S. PATENT DOCUMENTS

| | | | |
|---|---|---|---|
| 2009/0133388 A1* | 5/2009 | Watanabe | F01N 3/2053 60/286 |
| 2011/0072791 A1* | 3/2011 | Bidner | B60K 6/485 60/287 |
| 2014/0041367 A1* | 2/2014 | Balthes | F02M 26/24 60/274 |
| 2015/0040543 A1 | 2/2015 | Shetney et al. | |
| 2015/0135680 A1* | 5/2015 | Ancimer | F02D 17/00 60/274 |
| 2015/0204226 A1 | 7/2015 | Moore | |
| 2016/0146161 A1* | 5/2016 | Sun | F01N 3/021 60/311 |
| 2022/0010710 A1* | 1/2022 | Andersson | F01N 13/0093 |

FOREIGN PATENT DOCUMENTS

| | | | |
|---|---|---|---|
| DE | 10 2017 123492 A1 | 4/2019 | |
| DE | 102018106588 A1 * | 9/2019 | ......... B01D 53/9495 |
| EP | 2280155 A2 | 2/2011 | |
| JP | 2013124610 A | 6/2013 | |
| WO | WO 2019059837 A1 | 3/2019 | |

OTHER PUBLICATIONS

European Patent Office, Extended European Search Report and Opinion, EP Patent Application No. 19926286.6, Oct. 26, 2022, five pages.

* cited by examiner

POST-TREATMENT SYSTEM, METHOD FOR CONTROLLING POST-TREATMENT SYSTEM, AND VEHICLE

FIELD

The present application relates to the technical field of SCR systems, and more specifically, relates to a post-treatment system, a method for controlling the post-treatment system and a vehicle.

BACKGROUND

SCR is a process for treating $NO_x$ in an exhaust gas of a diesel vehicle, that is, with the aid of a catalyst, a reductant, typically ammonia or an urea, is sprayed into the exhaust gas for reducing the $NO_x$, so as to save energy and reduce emission.

An existing double-spray technical solution is based on two series SCR systems. The two SCR systems are located downstream of a supercharger. A first urea nozzle, corresponding to one SCR system, is controlled to spray the urea first, and in a case that a temperature of the other SCR system is relatively high, a second urea nozzle, corresponding to the other SCR system, is controlled to spray the urea, and the two urea nozzles spray the urea at the same time. In the two series SCR systems, energy loss is caused if the exhaust gas flows through the supercharger at a low temperature, which results in a low $NO_x$ conversion efficiency; and the post-treatment system has a large heat capacity and a high back pressure at a high temperature, which affects the engine performance.

SUMMARY

In view of this, a post-treatment system, a method for controlling the post-treatment system and a vehicle are provided according to the present application, which intends to solve the above technical problems.

In order to solve the above technical problems, the solution is provided as follows.

A post-treatment system, includes:
a temperature sensor, a three-way valve, a supercharger, a DOC (diesel oxide catalyst), and a first SCR (first selectively catalytic reduction) which are arranged in a main exhaust pipeline in a listed sequence;
a bypass pipeline arranged in parallel with the supercharger, and an input port of the bypass pipeline is connected to an outlet of the three-way valve, and an output port of the bypass pipeline is connected to a pipeline between the supercharger and the DOC;
a second SCR arranged in the bypass pipeline;
a first spray system for spraying a reductant into a pipeline between the first SCR and the DOC;
a second spray system for spraying a reductant into a pipeline between the second SCR and the three-way valve; and
a controller respectively connected to the temperature sensor, the three-way valve, the first spray system and the second spray system.

The second SCR is connected in parallel with the supercharger, the three-way valve is arranged upstream of the second SCR and the supercharger, the three-way valve is configured to control whether exhaust gas flows through the second SCR or the supercharger, which ensures the $NO_x$ conversion efficiency at a low speed and a low load, and improves the performance of the post-treatment system.

In an embodiment, a catalyst carrier of the second SCR is made of metal. A catalyst is made of metal, which can quickly raise the temperature and has a good low-temperature ignition characteristic.

In another embodiment, the reductant sprayed by the second spray system is solid ammonia. The second spray system that sprays the solid ammonia upstream of the second SCR can effectively reduce the $NO_x$ emission at the low temperature, and prevent the occurrence of urea crystallization at the same time.

In another embodiment, the reductant sprayed by the first spray system is solid ammonia or urea solution.

In another embodiment, the first SCR is specifically an SCRF (SCR on Filter). The working principle of the SCRF is that the SCR catalyst, such as a copper zeolite Cu/ZSM-5, is coated on a substrate surface of a wall-flow DPF with high porosity. A wall surface of a filter body can not only catalyze the oxidation of deposited soot, but also catalyze the reduction of the $NO_x$ with the aid of the reductant $NH_3$. On the basis of significantly reducing the $NO_x$ emission and PM emission of the diesel engine, the miniaturization, light-weight and low cost of the post-treatment device are realized at the same time.

A method for controlling a post-treatment system, based on the post-treatment system according to any one of the above, includes:
obtaining a collected temperature of the temperature sensor; and
determining whether the collected temperature is higher than a first temperature threshold,
if the collected temperature is not greater than the first temperature threshold, controlling the three-way valve in a first position,
controlling the second spray system in a working state if the collected temperature is higher than a second temperature threshold, and
controlling the first spray system in a working state if a temperature of an exhaust gas in the pipeline between the first SCR and the DOC is higher than a third temperature threshold,
in a case that the three-way valve is in the first position, the exhaust gas flows through a bypass branch and does not flow through a branch where the supercharger exists;
if the collected temperature is greater than the first temperature threshold, controlling the three-way valve in a second position,
controlling the second spray system in a closed state, and
controlling the first spray system in the working state if the temperature of the exhaust gas in the pipeline between the first SCR and the DOC is higher than the third temperature threshold,
in a case that the three-way valve is in the second position, the exhaust gas flows through the branch where the supercharger exists and does not flow through the bypass branch.

In a case that the temperature of the exhaust gas is relatively low, the supercharger branch is closed by the three-way valve, the exhaust gas goes through the bypass pipeline, which reduces the energy loss of the exhaust gas flowing through the supercharger and improves the NOx conversion efficiency at the low temperature. In a case that the temperature of the exhaust gas is relatively high, the bypass pipeline is closed, the exhaust gas flows through the supercharger and the first SCR, and the first SCR is used, which reduces the NOx emission in the exhaust gas, reduces the heat capacity and back pressure of the post-treatment system, and reduces the influence of the post-treatment system on engine performance.

A vehicle includes the post-treatment system according to any one of the above.

Compared with the conventional technology, the technical solution of the present application has the following advantages:

in the post-treatment system provided by the above technical solution, the second SCR is connected in parallel with the supercharger, the three-way valve is arranged upstream of the second SCR and the supercharger, and the three-way valve is configured to control whether the exhaust gas flows through the second SCR or the supercharger. In the case that the temperature of the exhaust gas is relatively low, the three-way valve is controlled to close the supercharger branch, so that the exhaust gas flows through the second SCR and the first SCR in series, which reduces the energy loss of the exhaust gas flowing through the supercharger and improves the $NO_x$ conversion efficiency at the low temperature. In the case that the temperature of the exhaust gas is relatively high, the three-way valve is controlled to close the bypass pipeline, the exhaust gas flows through the supercharger and the first SCR, which reduces the heat capacity and back pressure of the post-treatment system, and further reduces the influence of the post-treatment system on the engine performance.

Any product implementing the present application does not necessarily need to achieve all the advantages described above at the same time.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only embodiments of the present application. For those skilled in the art, other drawings may be obtained based on the provided drawings without any creative work.

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other obtained without creative efforts by those of the ordinary skill in the art shall fall within the protection scope of the present application.

Figure 1:
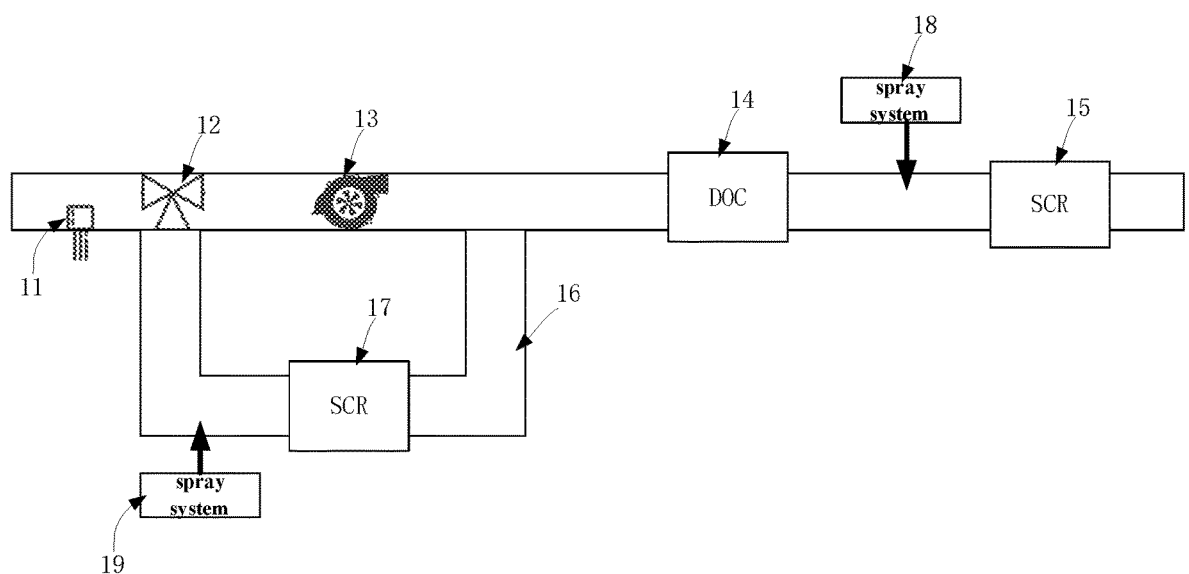
FIG. 1 is a schematic structural diagram of a post-treatment system according to an embodiment of the present application.

Referring to FIG. 1, a post-treatment system is provided according to this embodiment, and the post-treatment system includes:

a temperature sensor 11, a three-way valve 12, a supercharger 13, a DOC 14, and a first SCR 15 which are arranged in a main exhaust pipeline of an engine in a listed sequence. In a specific embodiment, the first SCR 15 is specifically an SCRF.

A bypass pipeline 16 is arranged in parallel with the supercharger 13, an input port of the bypass pipeline 16 is connected to an outlet of the three-way valve 12, and an output port of the bypass pipeline 16 is connected to a pipeline between the supercharger 13 and the DOC 14. The three-way valve 12 includes one inlet and two outlets. One outlet is connected to a branch where the supercharger 13 exists, and the other outlet is connected to the bypass pipeline 16. The exhaust gas enters the three-way valve 12 through the inlet, and the exhaust gas can be controlled to flow through the supercharger 13 or the bypass pipeline 16 by the three-way valve 12.

A second SCR 17 is arranged in the bypass pipeline 16. In a specific embodiment, a catalyst carrier of the second SCR 17 is made of metal.

A first spray system 18 is configured to spray a reductant into a pipeline between the first SCR 15 and the DOC 14. In a specific embodiment, the reductant sprayed by the first spray system is solid ammonia or urea solution.

A second spray system 19 is configured to spray a reductant into a pipeline between the second SCR 17 and the three-way valve 12. In a specific embodiment, the reductant sprayed by the second spray system is solid ammonia.

A controller (not shown) is connected to the temperature sensor 11, the three-way 12, the first spray system 18 and the second spray system 19. The controller controls states of the three-way valve 12, the first spray system 18 and the second spray system 19 according to data collected by the temperature sensor 11 and the temperature of the exhaust gas in the pipeline between the first SCR 15 and the DOC 14.

Figure 2:
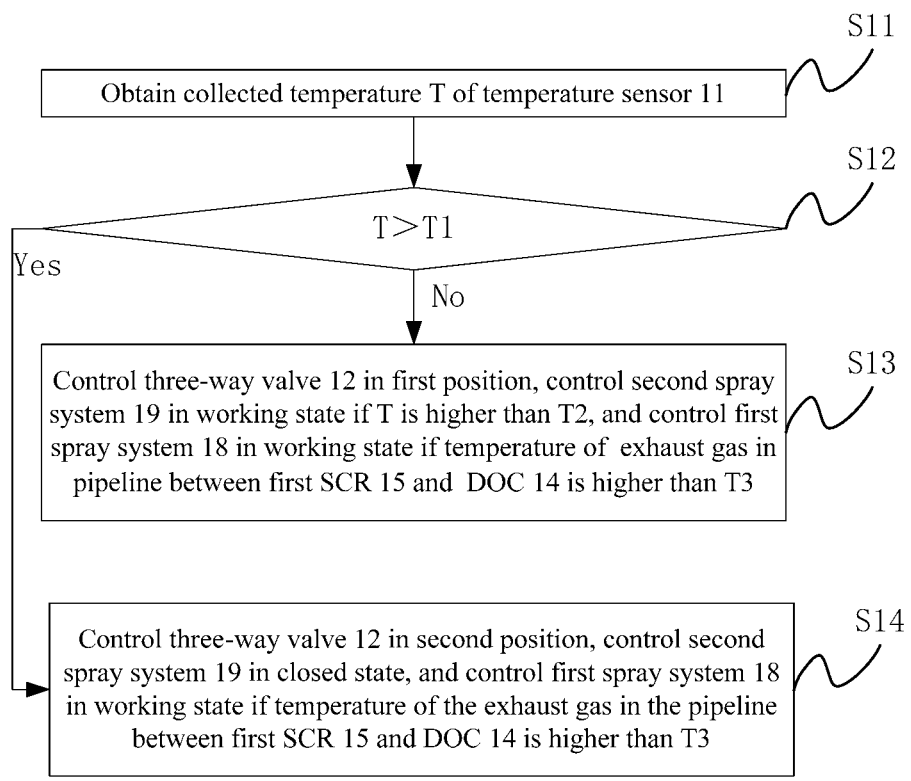
FIG. 2 is a flowchart of a control method for the post-treatment system according to the embodiment of the present application.

Referring to FIG. 2, a method for controlling a post-treatment system is provided according to this embodiment, which is used in the controller of the above post-treatment system, and the control method includes:

S11, obtaining a collected temperature T of the temperature sensor 11.

S12, determining whether the collected temperature is higher than a first temperature threshold T1, if the collected temperature T is not higher than the first temperature threshold T1, performing step S13, if the collected temperature T is higher than the first temperature threshold T1, performing step S14.

The first temperature threshold T1 is a calibration value obtained through a bench test. Specifically, the $NO_x$ conversion efficiency required by the post-treatment system is determined according to the requirements of an original emission and a target emission of the engine. According to the $NO_x$ emission results during a cold cycle, a temperature range that needs to improve the $NO_x$ conversion efficiency is determined. For example, if the $NO_x$ emission in a range below T Celsius degrees needs to be reduced, T1 is determined as a set value near t, a range of the temperature threshold T1 is found, T1 is calibrated, and finally the first temperature threshold T1 is determined according to the $NO_x$ emission.

S13, controlling the three-way valve 12 in a first position, controlling the second spray system 19 in a working state if the collected temperature T is higher than a second temperature threshold T2, and controlling the first spray system 18 in a working state if a temperature of an exhaust gas in the pipeline between the first SCR 15 and the DOC 14 is higher than a third temperature threshold T3.

In a case that the three-way valve 12 is in the first position, the exhaust gas flows through a bypass branch 16 and does not flow through a branch where the supercharger 13 exists. The second temperature threshold T2 and the third temperature threshold T3 are both preset values. In a case that the first spray system 18 sprays solid ammonia, the third temperature threshold T3 is set to 150 Celsius degrees, solid ammonia may start to be sprayed when the temperature of the exhaust gas in the pipeline between the first SCR 15 and the DOC 14 reaches 150 Celsius degrees. In a case that the first spray system 18 sprays urea aqueous solution, the third temperature threshold T3 is set to 180 Celsius degrees, urea aqueous solution may start to be sprayed when the temperature of the exhaust gas in the pipeline between the first SCR 15 and the DOC 14 reaches 180 Celsius degrees. In a case that the second spray system 19 sprays solid ammonia, the second temperature threshold T2 is set to 150 Celsius degrees, and the solid ammonia may start to be sprayed when the collected temperature T reaches 150 Celsius degrees. In a case that the second spray system 19 sprays urea aqueous solution, the second temperature threshold T2 is set to 180 Celsius degrees, and urea aqueous solution may start to be sprayed when the collected temperature T reaches 180 Celsius degrees.

S14, controlling the three-way valve 12 in a second position, controlling the second spray system 19 in a closed state, and controlling the first spray system 18 in the working state if the temperature of the exhaust gas in the pipeline between the first SCR 15 and the DOC 14 is higher than the third temperature threshold T3.

In a case that the three-way valve 12 is in the first position, the exhaust gas flows through the branch where the supercharger 13 exists and does not flow through the bypass branch 16.

A vehicle is further provided according to the embodiment, which includes the above post-treatment system.

In the present application, relational terms such as first and second are only used to distinguish one entity or operation from another entity or operation, and do not necessarily require or imply any such actual relationship or sequence between the existence of these entities or operations. Moreover, the terms "comprise", "include" or any other variants thereof are intended to cover non-exclusive inclusion, so that a process, method, article, or device including a series of elements includes not only those elements, but also other elements not explicitly listed, or elements inherent in such process, method, article, or device. Without further limitation, the element defined by the sentence "include a" does not exclude the existence of other identical elements in the process, method, article, or device including the element.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A post-treatment system, comprising:
a temperature sensor, a three-way valve, a supercharger, a diesel oxide catalyst, and a first selectively catalytic reduction which are arranged in a main exhaust pipeline in a listed sequence;
a bypass pipeline arranged in parallel with the supercharger, wherein an input port of the bypass pipeline is connected to an outlet of the three-way valve, and an output port of the bypass pipeline is connected to a pipeline between the supercharger and the diesel oxide catalyst;
a second selectively catalytic reduction arranged in the bypass pipeline;
a first spray system for spraying a reductant into a pipeline between the first selectively catalytic reduction and the diesel oxide catalyst;
a second spray system for spraying a reductant into a pipeline between the second selectively catalytic reduction and the three-way valve; and
a controller connected to the temperature sensor, the three-way, the first spray system and the second spray system.

2. The post-treatment system according to claim 1, wherein a catalyst carrier of the second selectively catalytic reduction is made of metal.

3. The post-treatment system according to claim 1, wherein the reductant sprayed by the second spray system is solid ammonia.

4. The post-treatment system according to claim 1, wherein the reductant sprayed by the first spray system is solid ammonia or urea solution.

5. The post-treatment system according to claim 1, wherein the first selectively catalytic reduction is an SCRF.

6. A method for controlling a post-treatment system, based on the post-treatment system according to claim 1, comprising:
obtaining a collected temperature of the temperature sensor; and
determining whether the collected temperature is higher than a first temperature threshold,
if the collected temperature is not higher than the first temperature threshold, controlling the three-way valve in a first position, controlling the second spray system in a working state if the collected temperature is higher than a second temperature threshold, and controlling the first spray system in a working state if a temperature of an exhaust gas in the pipeline between the first selectively catalytic reduction and the diesel oxide catalyst is higher than a third temperature threshold, wherein in a case that the three-way valve is in the first position, the exhaust gas flows through a bypass branch and does not flow through a branch where the supercharger exists;
if the collected temperature is higher than the first temperature threshold, controlling the three-way valve in a second position, controlling the second spray system in a closed state, and controlling the first spray system in the working state if the temperature of the exhaust gas in the pipeline between the first selectively catalytic reduction and the diesel oxide catalyst is higher than the third temperature threshold, wherein in a case that the three-way valve is in the second position, the exhaust gas flows through the branch where the supercharger exists and does not flow through the bypass branch.

7. A vehicle, comprising the post-treatment system according to claim 1.

* * * * *